（12）United States Patent
Gouider et al.

(10) Patent No.: US 10,017,665 B2
(45) Date of Patent: Jul. 10, 2018

(54) PROCESS FOR PREPARING A STABLE AQUEOUS DISPERSION OF POLYAMIDE-IMIDE WHICH IS FREE OF CARCINOGENIC, MUTAGENIC OR REPROTOXIC SUBSTANCES, AND APPLICATION TO COATINGS

(71) Applicants: VALLOUREC OIL AND GAS FRANCE, Aulnoye-Aymeries (FR); NIPPON STEEL & SUMITOMO METAL CORPORATION, Chiyoda-ku (JP)

(72) Inventors: Mohamed Gouider, Caluire-et-Cuire (FR); Eric Gard, Genay (FR); Eliette Pinel, Sainte-Euphemie (FR); Mikael Petit, Villefranche sur Saone (FR)

(73) Assignees: VALLOUREC OIL AND GAS FRANCE, Aulnoye-Aymeries (FR); NIPPON STEEL & SUMITOMO METAL CORPORATION, Chiyoda-ku (JP)

( * ) Notice: Subject to any disclaimer, the term of this patent is extended or adjusted under 35 U.S.C. 154(b) by 305 days.

(21) Appl. No.: 14/427,543

(22) PCT Filed: Sep. 11, 2013

(86) PCT No.: PCT/EP2013/068798
§ 371 (c)(1),
(2) Date: Mar. 11, 2015

(87) PCT Pub. No.: WO2014/044583
PCT Pub. Date: Mar. 27, 2014

(65) Prior Publication Data
US 2015/0247060 A1    Sep. 3, 2015

(30) Foreign Application Priority Data
Sep. 12, 2012 (FR) .................... 12 02426

(51) Int. Cl.
*C09D 179/08* (2006.01)
*C08J 3/05* (2006.01)
(Continued)

(52) U.S. Cl.
CPC ............. *C09D 179/08* (2013.01); *B05D 1/02* (2013.01); *C08G 73/14* (2013.01); *C08J 3/07* (2013.01);
(Continued)

(58) Field of Classification Search
CPC ...................................... C09D 179/08
See application file for complete search history.

(56) References Cited

U.S. PATENT DOCUMENTS 4,087,394 A   5/1978   Concannon
4,259,221 A   3/1981   Pauze
(Continued)

FOREIGN PATENT DOCUMENTS

EP   0 724 915 A1   8/1996
EP   1 197 268 A2   4/2002
(Continued)

OTHER PUBLICATIONS

International Search Report dated Nov. 12, 2013 in PCT/EP2013/068798.
(Continued)

*Primary Examiner* — Ling Siu Choi
*Assistant Examiner* — Thuy-Ai N Nguyen
(74) *Attorney, Agent, or Firm* — Oblon, McClelland, Maier & Neustadt, L.L.P.

(57) ABSTRACT

The invention concerns a process for preparing an aqueous polyamide-imide dispersion, characterized in that it comprises at least one step of selecting a polyamide-imide powder and a step of producing a dispersion comprising the polyamide-imide powder, a polar aprotic solvent with a (Continued)

boiling point of more than 180° C. at 760 mm Hg, and water. The invention also concerns a process for producing a dry polyamide-imide film on a substrate.

22 Claims, 2 Drawing Sheets

(51) Int. Cl.
C08G 73/14 (2006.01)
C09D 5/04 (2006.01)
C09D 7/61 (2018.01)
C08J 3/07 (2006.01)
B05D 1/02 (2006.01)
C08K 5/06 (2006.01)
C09D 5/14 (2006.01)

(52) U.S. Cl.
CPC .................. *C08K 5/06* (2013.01); *C09D 5/14* (2013.01); *C08J 2379/08* (2013.01)

(56) References Cited

U.S. PATENT DOCUMENTS

| | | | |
|---|---|---|---|
| 5,037,862 A | 8/1991 | Nishizawa et al. |
| 5,468,798 A | 11/1995 | Leech |
| 5,560,978 A | 10/1996 | Leech |
| 5,789,083 A | 8/1998 | Thomas |
| 6,291,054 B1 | 9/2001 | Thomas et al. |
| 6,479,581 B1 | 12/2002 | Ireland et al. |
| 2002/0002229 A1 | 1/2002 | Thomas et al. |
| 2007/0238812 A1 | 10/2007 | Kashiwagi |
| 2008/0269393 A1 | 10/2008 | Bate et al. |
| 2008/0275162 A1 | 11/2008 | Schwab et al. |
| 2009/0048384 A1 | 2/2009 | Wang et al. |
| 2011/0081493 A1 | 4/2011 | Matsushita |

FOREIGN PATENT DOCUMENTS

| | | |
|---|---|---|
| EP | 1 291 734 A2 | 3/2003 |
| EP | 1 754 761 A1 | 2/2007 |
| EP | 2 502 952 | 9/2012 |
| GB | 2 451 931 A | 2/2009 |
| JP | 2004-204073 | 7/2004 |
| JP | 2009-067880 | 4/2009 |
| WO | WO 95/22583 A1 | 8/1995 |
| WO | WO 2007/065880 A2 | 6/2007 |
| WO | WO 2008/051901 A2 | 5/2008 |
| WO | WO 2009/014009 A1 | 1/2009 |

OTHER PUBLICATIONS

Stephen Parcell, "Sulfur in human nutrition and applications in medicine", Sulfur, Alternative Medicine Review, 2002, vol. 7, No. 1, 2002, 23 pages.

Gilles P. Robertson, et al., "Structural determination of Torlon 4000T polyamide-imide by NMR spectroscopy", Polymer, 45, 2004, pp. 1111-1117.

Slade Havelock Gardner, "An Investigation of the Structure-Property Relationships for High Performance Thermoplastic Matrix, Carbon Fiber Composites with a Tailored Polyimide Interphase", Keywords: polyamic acid, polyimide, interphase, composite, 1998, 558 pages.

PROCESS FOR PREPARING A STABLE AQUEOUS DISPERSION OF POLYAMIDE-IMIDE WHICH IS FREE OF CARCINOGENIC, MUTAGENIC OR REPROTOXIC SUBSTANCES, AND APPLICATION TO COATINGS

The present invention relates to a process for the production of a dry film of polyamide-imide from a stable, ready-to-use aqueous dispersion which is free of carcinogenic, mutagenic or reprotoxic substances, said process comprising either a step for dispersion by means of a specific milling process preceded by a step for dissolution and precipitation, or a step for deflocculation by ultrasound treatment preceded by a dispersion step.

In order to overcome difficulties in using them, novel polyimides have been manufactured from the beginning of the 1970s. Such thermoplastic polyimides carry chemical groups which can render them fusible and soluble in solvents without significantly altering their properties. The principal thermoplastic polyimides are polyether-imides and polyamide-imides.

Polyamide-imides, which are high performance amorphous thermoplastic polymers, are widely used as impregnation resins and protective anti-corrosion varnishes for applications requiring good thermal behaviour or as binders for decorative, non-stick and self-lubricating paints.

Its principal qualities consist of very good film-forming properties, good surface hardness, good abrasion resistance, excellent adhesion to any metallic support, good resistance to solvents, fuels, acids, exceptional electrical rigidity and remarkable flexibility of the film above 220° C.

One of the main applications concerns glide coatings. In fact, the polyamide-imide polymer has superior mechanical properties as well as excellent chemical resistance. A Rockwell M hardness in the range 110 to 125, a resistance at break and compressive strength in the range 110 to 220 MPa mean that it can cope with the pressure and shear type loads occurring in a metal-metal contact.

Since a polyamide-imide polymer is practically insoluble, application in the form of a coating necessitates a vital step of dissolution in an appropriate dipolar aprotic solvent. For applications as a protective layer of a fuser element, Xerox Corporation proposes, for example, dissolving an Amoco® AI-10 polyamide-imide in a mixture of acetone and dipolar aprotic solvent with a high boiling point, namely N-methyl-2-pyrrolidone (NMP) (EP 1 291 734).

In addition, in order to facilitate the application of polyamide-imides and to limit the use of organic solvents with a high boiling point in non-negligible quantities, or solvents considered to be highly volatile oxygen compounds (tetrahydrofuran, THF), the skilled person will strive to find versions of functionalized polymers which are soluble in water or aqueous dispersions for a large variety of applications. The use of polyamide acid salts is thus at the origin of inventions in that field.

One of the very first patents mentioning taking polyamide acid salts into aqueous dispersion is U.S. Pat. No. 4,087,394 filed by E I Du Pont de Nemours and Co. That patent pertains to the preparation of coatings with lubricant, unmoulding, chemical resistance, high temperature resistance and electrically insulating properties from an aqueous dispersion containing a fluoropolymer as the major ingredient and a polyimide precursor in solution which is capable of forming a film below the melting point of the fluoropolymer (PTFE). The solution of polyamide acid salt, polyimide precursor, is constituted by a carboxylic polyamide acid with a water-soluble tertiary amine (triethylamine and/or diethylethanolamine). However, a coalescing agent, exclusively N-methylpyrrolidone, is systematically added to facilitate film formation.

U.S. Pat. No. 4,259,221 from General Electric, based on earlier work, proposes applying a single polyamide-imide coating which is soluble in water or, preferably, in a water/organic solvent mixture in order to reduce costs arising from organic solvents, such as their environmental impact. Dispersing the polymer is facilitated by forming a salt with a tertiary amine (dimethylethanolamine). The powdered PAI polymer (Amoco® AI-10) is a polyamide-imide pre-polymer obtained by synthesis in two reactions: a reaction between a trimellitic anhydride and an aromatic polyamine, resulting in a polyamide-imide pre-polymer, followed by reaction between the pre-polymer and a polyisocyanate. The organic solvent selected from a list of dipolar aprotic solvents, in particular comprising: cresol, phenol, xylene, NMP, DMF, DMAc, DMSO, is exclusively NMP.

In patent US 2011 0081493, T Matsushita (Hitachi Chemical Ltd) typically reused the same process for obtaining a polyamide-imide resin in solution to applying a layer which is not adhesive as regards ink in a printing system. However, the whole range of soluble polyamide-imides marketed under the trade name HPC by Hitachi Chemical Ltd, in particular the HPC-1000 version given as an example in said patent, exclusively contains organic solvents such as γ-butyrolactone, NMP, NEP or, as is preferred, NMP/water mixtures. In another patent, U.S. Pat. No. 5,037,862, Hitachi Chemical Ltd also form a paste from at least 40% of an aromatic polyamide-imide resin in a solvent for serigraphy applications. The solvents could be selected from the following substances: lactones, aliphatic ketones, ethers, phenols, DMSO and sulpholane. However, the process consists of dispersing fine particles of aromatic polyamide-imide resin (40 μm) in a solution of polyamide-imide resin, preferably dissolved in an ether such as THF, triethylene glycol dimethyl ether, without providing details as to whether the paste obtained can be dispersed in water.

AkzoNobel proposes using the same type of polyamide-imide in aqueous dispersion in an application concerning a paint for aluminium cooking utensils. The corresponding EP 0 724 915 concerns the application of an aqueous dispersion of PTFE containing a polyamide-imide binder. The proportion of NMP in the final aqueous polyamide-imide dispersion is 11% by weight.

The same approach is claimed by DuPont de Nemours in U.S. Pat. No. 5,789,083.

U.S. Pat. No. 6,479,581 from Solvay Advanced Polymers illuminates the preferential molecular structure of a soluble polyamide-imide pre-polymer for generating a non-tacky, adhesive film on a wide variety of ferrous and non-ferrous substrates including steel, aluminium and copper. A solution of polyamide-amic acid obtained by synthesis in an aliphatic tertiary amine (triethylamine) would considerably favour dispersion in water. The invention stipulates that the quantity of residual organic solvent in the pre-polymer is in the range 0.1% to 5% by weight. In reality, the moist Torlon® AI-30 powder corresponding to the soluble pre-polymer obtained by synthesis contains at least 2% by weight of residual NMP solvent.

In response to the above technique, which consists of functionalizing the polymer, in U.S. Pat. No. 5,468,798, Whitford Corp proposed dissolving a polyamide-imide resin in a suitable polar aprotic solvent such as NMP then milling the resin precipitated in water by means of a ball mill. Starting from this stable aqueous dispersion of PAI resin particles in a water/NMP mixture, Whitford proposed producing a dry adhesion-promoting layer of between 20 and 30 μm, rendered sufficiently rough and adhesive by means of filamentary nickel. The scratch resistance and abrasion resistance of a PAI polymer means that the traditional "teflonning" in cooking utensils, electrical appliances or printing machines can readily be replaced.

However, even though a number of technological advances claim the possibility of preparing an aqueous dispersion or a polyamide-imide resin which is soluble in water, none of them is completely free of CMR category substances and there is currently no ready-to-use commercially available dispersion of this polymer on the market. In other words, this type of alternative simply results in a drastic reduction in the volatile organic substances released. For this reason, all of the aqueous solutions currently on the market for application in the form of a coating (Altana, Fujifilm Hunt Chemicals, Okitsumo, Solvay) in fact contain CMR category substances, sometimes in relatively large quantities.

In view of the regulations regarding the working environment (Directive 2004/37/EC from the European Parliament and Council dated 29 Apr. 2004 regarding the protection of workers against risks linked to exposure to carcinogenic or mutagenic agents in the workplace) and the classification of evaporated substances (Commission Directive 2009/2/EC dated 15 Jan. 2009, amending, for the purposes of its adaptation to technical progress, for the 31 time, Council Directive 67/548/EEC on the approximation of dispositions relating to the classification, packaging and labelling of dangerous substances; (EC) Rule no 1272/2008 European Parliament and Council dated 16 Dec. 2008 relating to the classification, labelling and packaging of substances and mixtures), the risk to the user is particularly high.

Polar solvents (toluene, xylene), in particular polar aprotic solvents containing nitrogen, such as NMP, N,N-dimethylacetamide (DMAc), N,N-dimethylformamide (DMF), hexamethylphosphoramide (HMPA), etc, employed when forming a polyamide-imide film are substances which are classified as carcinogenic, mutagenic or reprotoxic (CMR) which are subject to prohibition or restricted use in many applications.

The limiting concentration thresholds for the most sensitive carcinogenic and mutagenic substances, classed as 1A (can cause cancer), 1B (may induce a genetic anomaly), are 0.1% or less in mixtures and 0.3% or less for reprotoxic substances. Other CMR substances of class 2, deemed to be of concern for fertility and human development, have to be in concentrations of 1% or less.

The classification of the polar aprotic solvents used and their known toxicity is given in the table below.

| Substance name | CMR classification |
| --- | --- |
| N,N-dimethylacetamide | Reprotoxic cat. 1B |
| N,N-dimethylformamide | Reprotoxic cat. 1B |
| Hexamethylphosphoramide | Carcinogenic and mutagenic cat. 1B |
| N-methylpyrrolidone | Reprotoxic cat. 1B |
| Toluene | Reprotoxic cat. 2 |

The new classification for CMR substances in classes 1A, 1B and 2 will be applicable to mixtures from June 2015, and so it would be appropriate to provide a novel alternative in order to prevent the risk of chemical exposure to CMR agents in application of the French Labour Code (article R4411-73 and articles R231-56 to R231-56-12).

Starting from this point, the present invention proposes preparing an aqueous dispersion of an aromatic polyamide-imide polymer containing no CMR substances in order to generate a dry coating of polyamide-imide that is easy to apply, adherent to a wide variety of substrates, particularly to ferrous or non-ferrous metals, and that can be protective, lubricating and abrasion-resistant.

In particular, the present invention concerns a process for preparing a stable aqueous polyamide-imide dispersion, characterized in that it comprises at least the following steps:
  selecting a polyamide-imide powder;
  producing a dispersion comprising the polyamide-imide powder, a polar aprotic solvent with a boiling point of more than 180° C. at 760 mm Hg, and water.

In a first variation, the dispersion is produced with at least:
  a step in which the polyamide-imide powder is dissolved in the polar aprotic solvent with a boiling point of more than 180° C. at 760 mm Hg in order to obtain a polyamide-imide solution;
  a step in which the polymer solution is precipitated in an aqueous mixture at ambient temperature;
  a step in which the precipitated solution is dispersed and stabilized by milling the polyamide-imide particles.

In a second variation, the dispersion is produced with at least:
  a step in which the polyamide-imide powder is dispersed by mechanical agitation in a homogeneous mixture containing water and a polar aprotic solvent with a boiling point of more than 180° C. at 760 mm Hg;
  a step in which the polyamide-imide dispersion is stabilized by means of a treatment with ultrasound or by milling.

Optional characteristics, which may be complementary or substitutional, are defined below.

The proportion of polyamide-imide may be 35% by weight or less.

The step for dissolving the polyamide-imide powder in the first variation may be carried out at a temperature of more than 50° C., preferably more than 80° C.

The precipitation step in the first variation may be carried out at ambient temperature in an aqueous mixture containing distilled water and at least one non-ionic surfactant, the aqueous mixture being free of polyoxyethylenated alkylphenyl ethers.

The step for dispersion of the polyamide-imide powder by mechanical agitation in the second variation may be carried out at a temperature in the range 60° C. to 80° C. in a homogeneous mixture containing distilled water, a polar aprotic solvent and at least one non-ionic surfactant.

The non-ionic surfactant may be selected from the group constituted by polyoxyethylenated acetylenic diols and high molecular weight block copolymers containing groups with a high affinity for pigments, and may have a hydrophilic-lipophilic balance of 13 or less, preferably 8 or less.

The stabilization by ultrasound treatment in the second variation may be carried out at a minimum frequency of 20 kHz and a minimum power of 200 W.

The step for milling the polyamide-imide particles in the first variation and in the second variation may be carried out by vertical or horizontal bead milling, the milling yield being in the range 40% to 95%, preferably more than 90%.

The size of the polyamide-imide polymer particles in dispersion may be less than 70 μm, preferably less than 20 μm and primarily less than 10 μm.

The aqueous polyamide-imide dispersion may comprise a thixotropic agent which is thermally stable at temperatures of 250° C. or more selected from the group constituted by organically modified sheet silicates of the laponite, saponite, bentonite or smectite type with a pH in 2% by weight suspension in the range 9 to 11.

The aqueous polyamide-imide dispersion may comprise in the range 0.05% to 0.4% by weight of a bactericidal and/or fungicidal agent for protection during storage and for protection of the film, selected from the group constituted by iodopropynyl-butyl-carbamate, benzisothiazolinone, chloromethyl-isothiazolinone and methylisothiazolinone.

The aqueous polyamide-imide dispersion may comprise a spreading agent of the polyether modified dimethylpolysiloxane type to reduce the surface tension.

The aqueous polyamide-imide dispersion may comprise an anti-foaming agent which may be an emulsion of hydrophobic components containing silicone and/or paraffinic mineral oils.

The polyamide-imide (PAI) powder may be selected from aromatic polyamide-imide powders.

The selected aromatic polyamide-imide may be obtained from a reaction between a trimellitic acid anhydride chloride and an aromatic diamine selected from compounds other than 4,4'-methylenedianiline.

The selected polyamide-imide may preferably be selected from the group formed by aromatic polyamide-imide polymers with a molecular mass in the range 10000 to 30000 g/mole and a glass transition temperature in the range 220° C. to 285° C.

The maximum particle size in the polyamide-imide powder may be less than 150 µm, 95% of the particles having a size of less than 75 µm.

The mean volumetric granulometry of the polyamide-imide particles may be in the range 30 to 40 µm.

The polar aprotic solvent may be selected from the group constituted by dimethylsulphoxide, sulpholane and γ-butyrolactone.

The polar aprotic solvent may be dimethylsulphoxide.

The present invention also pertains to a process for producing a dry polyamide-imide film on a substrate, characterized in that it comprises:
  preparing a stable aqueous polyamide-imide dispersion in accordance with the first or second variation of the process described above;
  applying said aqueous dispersion to said substrate by spraying;
  curing said aqueous dispersion applied to the substrate at temperatures in the range 230° C. to 325° C.

Optionally, after curing, the substrate coated thereby may be cooled at ambient temperature.

Some characteristics and advantages of the invention are set out in more detail in the description below, made with reference to the accompanying drawings.

The process consists of preparing a ready-to-use aqueous dispersion of a polyamide-imide polymer.

Amorphous polyamide-imide polymers (PAIs) have mechanical bending, impact resistance and resistance at break properties which are superior to other heterocyclic polymers, namely polyimides (PI), polyetherimides (PEI), phenylene polysulphide (PPS) or polyether etherketone (PEEK). It can also be used to improve extrusion or moulding operations (as well as overmoulding), due in part to their having glass transition temperatures which are lower than the corresponding polyimides (Slade H Gardner "An investigation of the structure-property relationships for high performance thermoplastic matrix, carbon fibre composites with a tailored polyimide interphase", 1998).

The polyamide-imide polymer is preferably selected from aromatic polyamide-imides. Aromatic polyamide-imides are of particular interest in producing high temperature-resistant films and fibres.

Figure 1:
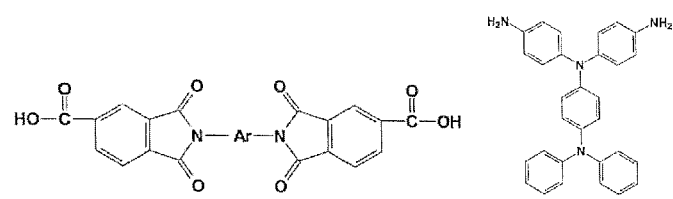
FIG. 1 represents a polycarboxylic diimide monomer and an aromatic diamine co-monomer.

The aromatic polyamide-imide polymer may be synthesized by a polycondensation reaction between a polycarboxylic diimide monomer and a diamine or diisocyanate co-monomer in a polar solvent. FIG. 1 represents an example with a dibasic carboxylic acid imide on the left and a diamine on the right.

Figure 2:
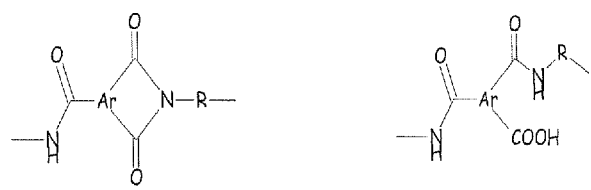
FIG. 2 represents an imide unit on the left and an amic acid on the right.

Synthesis of the polymer may also involve polycondensation of a diamine and a trimellitic acid anhydride chloride in a bipolar aprotic solvent. The reaction between the diamine and an anhydride produces an intermediate product, polyamic acid, which has to be cyclized. Cyclization or imidization of this precursor polymer by a chemical or thermal pathway gives rise to the final polyamide-imide. As can be seen in FIG. 2, the precursor obtained may have alternating imide and amic acid units, and preferably an imide unit proportion of more than 90%. FIG. 2 shows an imide unit on the left and an amic acid unit on the right in more detail.

Figure 3:
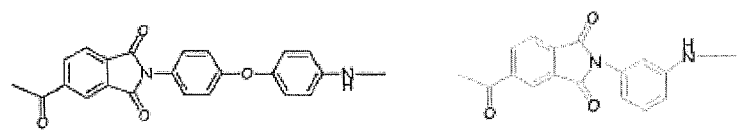
FIG. 3 represents a 1,3-polyamide-imide configuration on the left and a 1,4-polyamide-imide configuration on the right.

As can be seen in FIG. 3, depending on the diamine selected, the polymer may have a 1,3-polyamide-imide configuration, a 1,4-polyamide-imide configuration or a mixture. FIG. 3 shows a 1,3-polyamide-imide configuration on the left and a 1,4-polyamide-imide configuration on the right in more detail.

For the purposes of the invention, the selected aromatic polyamide-imide polymer is preferably obtained by a pathway which consists of reacting a trimellitic acid anhydride chloride and an aromatic diamine selected from compounds other than 4,4'-methylenedianiline, which is classified as a CMR substance.

The selected polyamide-imide polymer is preferably selected from the group formed by aromatic polyamide-imide polymers with a molecular mass in the range 10000 to 30000 g/mole, a glass transition temperature in the range 220° C. to 285° C., a molar fraction of polyamide-amic acid of 0.1 or less or an acid index of 20 mgKOH/g or less.

The thermal resistance of the polyamide-imide polymer increases with its molecular mass and its degree of imidization, and so an aromatic polyamide-imide polymer with a high molecular mass will advantageously be selected in order to increase the performance of the film (Robertson G, Polymers 2004, vol 45, pp 1111-1117).

In an advantageous embodiment, the Applicant proposes preparing an aqueous dispersion from a polyamide-imide powder with a maximum particle size of less than 150 µm wherein 95% of the particles have a size of less than 75 µm. Preferably, the mean volumetric granulometry is in the range 30 to 40 µm.

In a first variation and in a first step, the polyamide-imide polymer is dissolved in a polar aprotic solvent with a boiling point of more than 180° C. at 760 mm Hg for which the Hansen total solubility parameters, expressed as MPa$^{1/2}$, are close to those of the polyamide-imide polymer. The polymer solubility parameters, extracted from the European Polymer Journal, volume 22, Issue 10, 1986, pages 821-825, are approximately 3 MPa$^{1/2}$.

In order to ensure good stability on dispersion, the difference between the solubility parameters, δsolvent and δpolymer, should preferably be less than a value of 4 where there are strong specific solvent-polymer interactions, as shown by PAI dispersions in a water/NMP mixture, while the respective solubilities of water and NMP are respectively 47.9 MPa$^{1/2}$ and 22.9 MPa$^{1/2}$.

The polar aprotic solvents are advantageously selected from the group constituted by the following compounds: dimethylsulphoxide, sulpholane and γ-butyrolactone, preferably dimethylsulphoxide (DMSO) which has a zero-danger classification. In fact, DMSO is known to be one of the least toxic compounds. Its uses and applications form a compound that is in common use in the pharmacy field (Parcell S, "Sulfur in human nutrition and applications in medicine", Altern Med Rev 2002, vol 7, pp 22-44). DMSO has approximately 40 pharmacological properties which may be beneficial in the prevention, relief or regression of many diseases (Morton W, "DMSO, Nature's Healer", New York; Avery 1993).

Other solvents such as acetone, ethyl acetate, cyclohexanone, 1,3-dioxolane, methylethyl ketone, tetrahydrofuran or triethylamine, which are capable of complying with the solubility requirements, are clearly prohibited in view of their being classified as highly flammable substances.

The polyamide-imide polymer is preferably dissolved in DMSO at a temperature of more than 50° C. with mechanical agitation, preferably at more than 80° C., in order to facilitate dissolution and to avoid recrystallization phenomena at ambient storage temperature.

The proportion of polymer dissolved in the solvent is 35% by weight or less, advantageously 30% or less in order to provide a kinematic viscosity which is acceptable in view of the second step.

In a second step, the solution of polymer, maintained at a minimum temperature of 50° C., is slowly precipitated in an aqueous mixture at ambient temperature. Addition is preferably carried out drop by drop with vigorous agitation and high shear (minimum 7000 rpm) using an IKA® or Ultra Turrax® disperser-homogenizer to obtain a maximum grain size of 1 mm. The aqueous mixture contains distilled water and at least one non-ionic surfactant selected from the group constituted by polyoxyethylenated acetylenic diols. The non-ionic surfactant preferably has a hydrophilic-lipophilic balance of 13 or less, preferably 8 or less, in order to reduce the surface tension at equilibrium and the dynamic surface tension and to ensure that the polymer-solvent system is wetted in the water. The aqueous mixture is free of polyoxyethylenated alkylphenyl ethers.

The aqueous mixture may also comprise a thixotropic agent which is thermally stable at temperatures of 250° C. or higher selected from the group constituted by organically modified sheet silicates of the laponite, saponite, bentonite or smectite type with a pH in suspension at 2% by weight in the range 9 to 11.

The aqueous mixture may also comprise in the range 0.05% to 0.4% by weight of a bactericidal/fungicidal agent or a synergy to provide protection during storage and protection of the film selected from the group constituted by the following biocidally active substances: iodopropynyl-butyl-carbamate, benzisothiazolinone, chloromethyl-isothiazolinone and methylisothiazolinone.

The present invention comprises a third step with the aim of reducing the size of the suspended particles by fine milling using a colloidal bead or basket mill. The colloidal bead or basket mill is preferably a modular vertical system with a recirculation system sold, for example, by Brant Industrie under the trade name DISPERMAT®. The diameter of the ceramic or metallic beads is 1 mm or less, preferably 0.4 mm or less. Dispersion by milling is carried out at a minimum rate of 600 rpm and at constant power in order to ensure mechanical de-agglomeration of the associated particles (agglomerates and aggregates) into finer particles and stabilization of the finer particles produced during dispersion to prevent them from re-agglomerating (or "flocculating"). After a purge in compressed air and washing with distilled water, the milling yield is in the range 40% to 95%, preferably more than 90%.

Alternatively, fine milling may be carried out by recirculating the dispersion in a horizontal colloidal bead mill with a cooled, pressurized milling chamber (for example an HMP type SUSSMEYER® mill).

Figure 4:
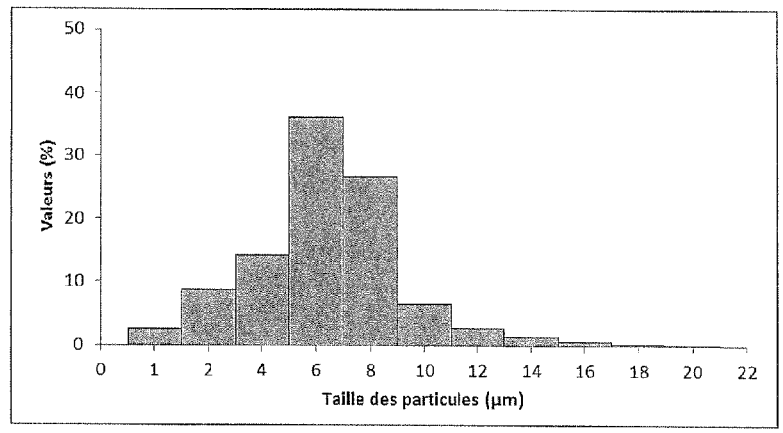
FIG. 4 represents the granulometry of an aqueous dispersion of polyamide-imide obtained by a process in accordance with the invention.

The particle size may be measured in the liquid phase using a CILAS 1064 laser granulometer. The size of the polyamide-imide polymer particles in dispersion is preferably less than 20 μm and primarily less than 10 μm. FIG. 4 illustrates the granulometry of an aqueous polyamide-imide dispersion obtained by said process.

Functional pigment fillers may be added, preferably during milling or as a subsequent addition.

In a second variation, the Applicant proposes preparing an aqueous polyamide-imide dispersion in a first step by dispersion with mechanical agitation (300 to 600 rpm) using a propeller mixer in a water/DMSO mixture with proportions of water and DMSO varying between 60/40 and 20/80 depending on the quantity of polymer to be dispersed. The efficiency of dispersion is given by the shear rate at constant peripheral speed as a function of volume and diameter of the propeller. The temperature of the mixture is advantageously more than 60° C. in order to facilitate dispersion and less than 80° C. in order to limit evaporation. The aqueous mixture may contain at least one non-ionic surfactant selected from the group constituted by polyoxyethylenated acetylenic diols and high molecular weight block copolymers with groups having a high affinity for the pigments. In a second step, disintegration of the particles and homogenization of the dispersion are ensured by milling or an ultrasound treatment (ultrasonication) either in an ultrasound bath with mechanical agitation, or using an ultrasound probe (HIELSCHER® UIP, SONITUBE®). The frequency and the minimum power are respectively 20 kHz and 200 W. In the case in which functional pigment fillers are added during mechanical dispersion, the stability of the dispersion is preferably ensured by bead milling.

The functional pigment fillers may also be added during milling or post addition.

The proportion of polyamide-imide in the final dispersion is preferably in the range 5% to 20%. If the concentration is greater than 20% by weight, the fluidity is reduced, which renders application difficult; if the concentration is less than 5% by weight, it becomes more complicated to form a film of sufficient thickness.

Figure 5:
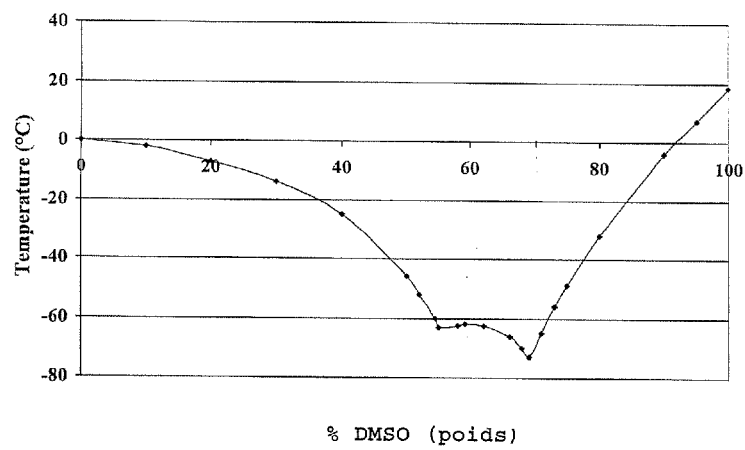
FIG. 5 represents the freezing point for a water-dimethylsulphoxide mixture as a function of the fraction of dimethylsulphoxide.

The proportion of co-solvent with respect to the water in the dispersion is preferably in the range 40% to 80% in order to guarantee good stability during cold storage. FIG. 5 illustrates the freezing point for a water-dimethylsulphoxide mixture as a function of the dimethylsulphoxide fraction.

The aqueous dispersion may also comprise a modified polyether dimethylpolysiloxane type spreading agent in order to reduce the surface tension and to improve film formation.

Finally, the aqueous dispersion may comprise an anti-foaming agent such as an emulsion of hydrophobic components containing silicone and paraffinic mineral oils in order to facilitate film formation, particularly for high concentrations by volume of pigments.

In conclusion, the aqueous dispersion prepared thereby contains a minimum of 7% by weight of the polyamide-imide polymer formulation.

The aqueous dispersion contains no concentrations of a carcinogenic, mutagenic or reprotoxic substance appearing on the CIRC (IARC), ACGIH, NTP and/or OSHA lists in a concentration of 0.1% or higher.

The aqueous dispersion has a neutral pH in the range 7 to 7.5, a dynamic viscosity in the range 0.1 to 1 Pa·s at 20° C. depending on the proportion of polymer and a stability on storage of at least two weeks at a temperature of −5° C. or 40° C.

The polyamide-imide film may be obtained by pneumatic spraying or cold electrostatic spraying. The aqueous dispersion is sufficiently thixotropic to allow it to be applied to a vertical surface. The solvents are evaporated off during a drying phase at 80° C. The dry film is formed after a curing phase at temperatures in the range 230° C. to 325° C. depending on the polymer, preferably at a temperature which is at least 10° C. higher than the glass transition temperature of said polymer. Cooling may be carried out at ambient temperature.

The DMSO co-solvent, which is moderately volatile and thermally stable at 150° C., is evaporated off completely during the drying step, principally between 40° C. and 80° C. by elution with water. No decomposition product apart from $CO_2$, analysed by ATG-IRTF, is detected during the curing step between 230° C. and 325° C. The volatile organic compounds given off during the drying phase, principally DMSO and dimethyl sulphide (DMS), is readily recycled by re-condensation.

Functional additives or pigment fillers may be added to the aqueous dispersion, preferably during milling in order, inter alia, to guarantee the lubrication and wear resistance properties.

The invention claimed is:

1. A process for preparing a stable aqueous polyamide-imide dispersion, the process comprising:
    selecting a polyimide-imide powder; and
    producing a dispersion comprising the polyamide-imide powder, a polar aprotic solvent having a boiling point of more than 180° C. at 760 mm Hg and water, wherein the polar aprotic solvent is at least one selected from the group consisting of dimethylsulphoxide, sulpholane, and γ-butyrolactone, and
    wherein the aqueous polyamide-imide dispersion comprises a thixotropic agent which is thermally stable at a temperature of 250° C. or more and is at least one selected from the group consisting of an organically modified sheet silicate of laponite, saponite, bentonite, and smectite type having a pH of from 9 to 11 in a 2% by weight suspension.

2. The process of claim 1, further comprising:
    dissolving the polyamide-imide powder in the polar aprotic solvent having a boiling point of more than 180° C. at 760 mm Hg, thereby obtaining a polyamide-imide solution;
    precipitating the polyamide-imide solution in an aqueous mixture at ambient temperature; and
    dispersing the precipitated solution and stabilizing by milling polyamide-imide particles.

3. A process for preparing a stable aqueous polyamide-imide dispersion according to claim 1, characterized in that the dispersion is produced with at least:
    a step in which the polyamide-imide powder is dispersed by mechanical agitation in a homogeneous mixture containing water and a polar aprotic solvent with a boiling point of more than 180° C. at 760 mm Hg;
    a step in which the polyamide-imide dispersion is stabilized by means of a treatment with ultrasound or by milling.

4. The process of claim 1, wherein an amount of polyamide-imide is 35% by weight or less.

5. The process of claim 2, wherein the dissolving of the polyamide-imide powder is carried out at a temperature of more than 50° C.

6. The process of claim 2, wherein the precipitation is carried out at ambient temperature in an aqueous mixture containing distilled water and at least one non-ionic surfactant, wherein the aqueous mixture is free of polyoxyethylenated alkylphenyl ethers.

7. A process for preparing a stable aqueous polyamide-imide dispersion according to claim 3, characterized in that the step for dispersion of the polyamide-imide powder by mechanical agitation is carried out at a temperature in the range 60° C. to 80° C. in a homogeneous mixture containing distilled water, a polar aprotic solvent and at least one non-ionic surfactant.

8. A process for preparing a stable aqueous polyamide-imide dispersion according to claim 7, characterized in that the non-ionic surfactant selected from the group constituted by polyoxyethylenated acetylenic diols and high molecular weight block copolymers containing groups with a high affinity for pigments preferably has a hydrophilic-lipophilic balance of 13 or less, preferably 8 or less.

9. A process for preparing a stable aqueous polyamide-imide dispersion according to claim 3, characterized in that the stabilization by ultrasound treatment is carried out at a minimum frequency of 20 kHz and a minimum power of 200 W.

10. The process of claim 2, wherein the milling of the polyamide-imide particles is carried out by vertical or horizontal bead milling, wherein a yield of the milling is from 40% to 95%.

11. The process of claim 1, wherein a size of the polyamide-imide polymer particles in dispersion is less than 70 μηι.

12. The process of claim 1, wherein the aqueous polyamide-imide dispersion comprises from 0.05% to 0.4% by weight of a bactericidal and/or fungicidal agent, for protection during storage and for protection of a film, selected from the group consisting of iodopropynyl-butyl-carbamate, benzisothiazolinone, chloromethyl-isothiazolinone and methylisothiazolinone.

13. The process of claim 1, wherein the aqueous polyamide-imide dispersion comprises a spreading agent, wherein the spreading agent is a polyether modified dimethylpolysiloxane.

14. The process of claim 1, wherein the aqueous polyamide-imide dispersion comprises an anti-foaming agent which is an emulsion of a hydrophobic component containing a silicone oil, paraffinic mineral oil, or a combination thereof.

15. The process of claim 1, wherein the polyamide-imide powder is an aromatic polyamide-imide powder.

16. The process claim 15, wherein the aromatic polyamide-imide powder is obtained by reacting a trimellitic acid anhydride chloride and an aromatic diamine selected from compounds other than 4,4'-methylenedianiline.

17. The process claim 15, wherein the polyamide-imide powder is selected from the group consisting of aromatic polyamide-imide polymers having a molecular mass of from 10,000 to 30,000 g/mole and a glass transition temperature of from 220° C. to 285° C.

18. The process claim 15, wherein a maximum particle size in the polyamide-imide powder is less than 150 μm and 95% of the particles have a size of less than 75 μm.

19. The process claim 15, the wherein a mean volumetric granulometry of the polyamide-imide particles is from 30 to 40 μm.

20. The process claim 1, wherein the polar aprotic solvent is dimethylsulphoxide.

21. A process for producing a dry polyamide-imide film on a substrate, the process comprising:
   preparing a stable aqueous polyamide-imide dispersion according to claim 1;
   applying the stable aqueous polyamide-imide dispersion to the substrate by spraying;
   curing the stable aqueous polyamide-imide dispersion applied to the substrate at a temperatures of from 230° C. to 325° C.

22. The process of claim 21, wherein after the curing, the substrate with the applied stable aqueous polyamide-imide dispersion is cooled at ambient temperature.

* * * * *

UNITED STATES PATENT AND TRADEMARK OFFICE
CERTIFICATE OF CORRECTION

PATENT NO. : 10,017,665 B2
APPLICATION NO. : 14/427543
DATED : July 10, 2018
INVENTOR(S) : Mohamed Gouider et al.

Page 1 of 1

It is certified that error appears in the above-identified patent and that said Letters Patent is hereby corrected as shown below:

In the Specification

Column 3, Line 28, "31" should read --31$^{st}$--.

In the Claims

Column 9, Line 49, Claim 1, "polyimide" should read --polyamide--.

Column 10, Line 51, Claim 11, "μηι." should read --μm.--.

Column 11, Line 3, Claim 16, "process" should read --process of--;
    Line 7, Claim 17, "process" should read --process of--;
    Line 12, Claim 18, "process" should read --process of--;
    Line 13, Claim 18, "μιηand" should read --μm and--;
    Line 14, Claim 18, "μηι." should read --μm.--;
    Line 15, Claim 19, "process" should read --process of--;
    Line 17, Claim 19, "μηι." should read --μm.--; and
    Line 18, Claim 20, "process" should read --process of--.

Signed and Sealed this
Fifth Day of May, 2020

Andrei Iancu
*Director of the United States Patent and Trademark Office*